May 12, 1953 G. BOTTARO 2,638,409
COUNTERCURRENT EXTRACTION APPARATUS AND PROCESS
Filed Dec. 10, 1947 4 Sheets-Sheet 3
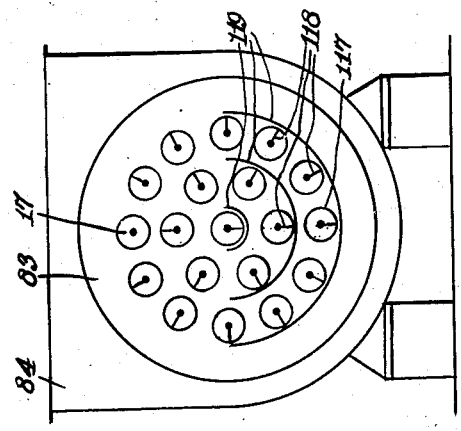
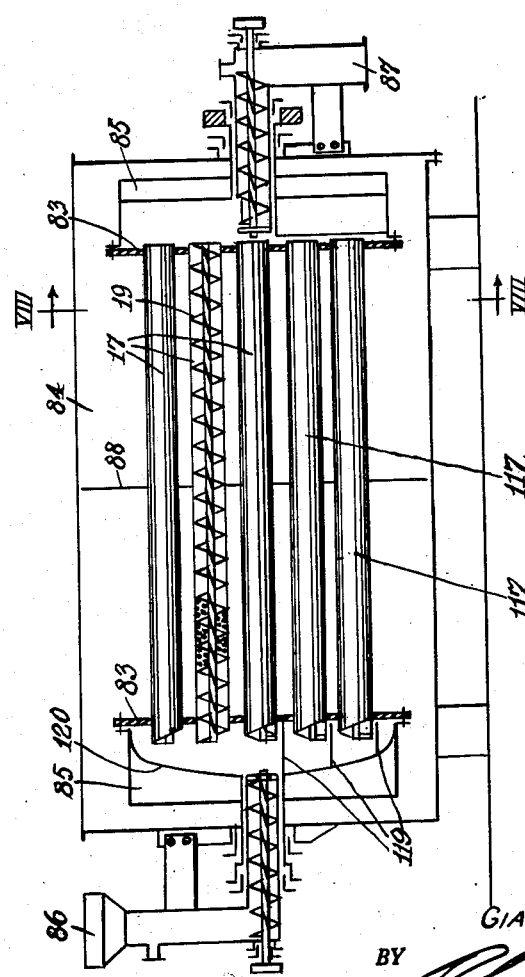
INVENTOR.
GIACOMO BATTARO
BY
ATTORNEY.

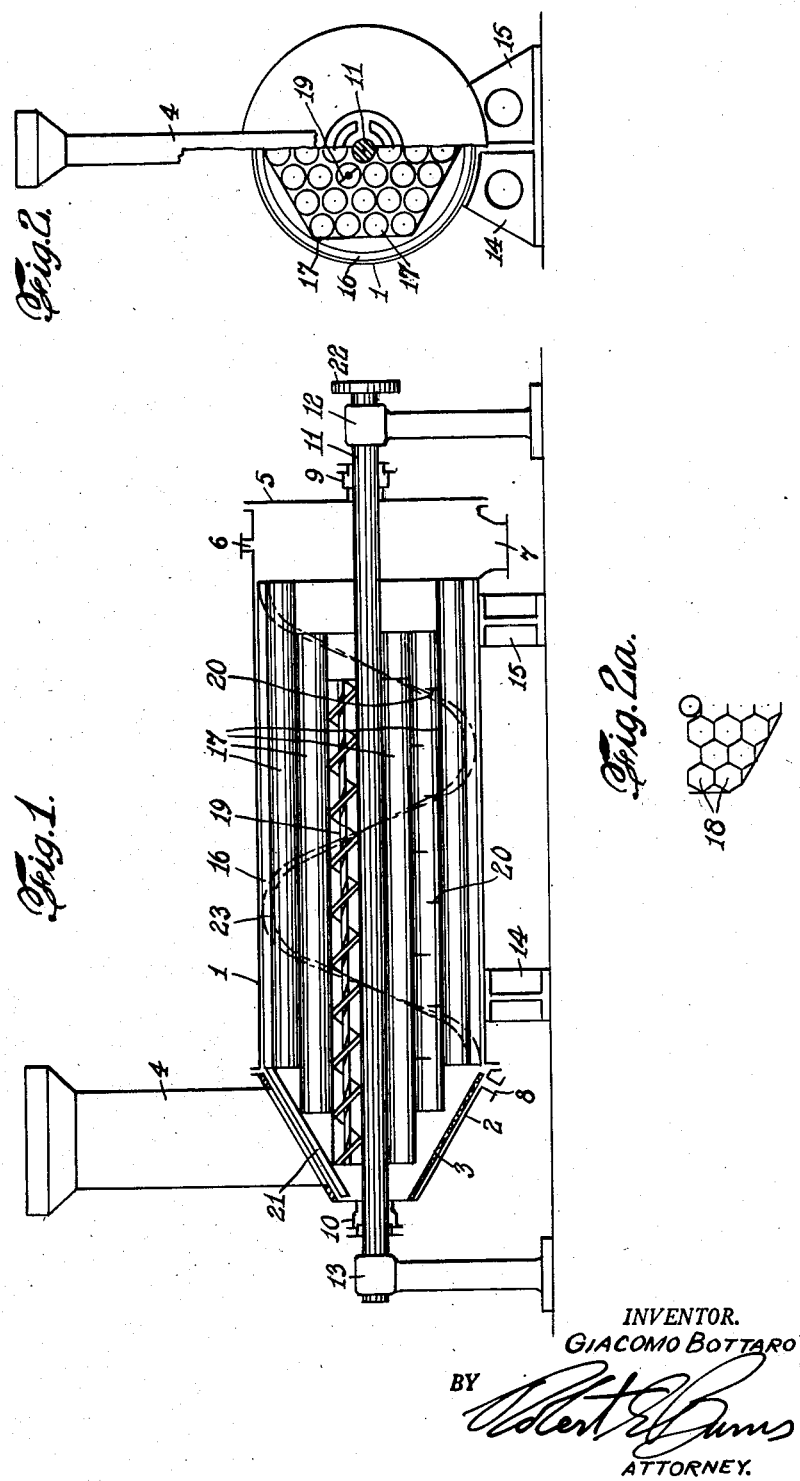

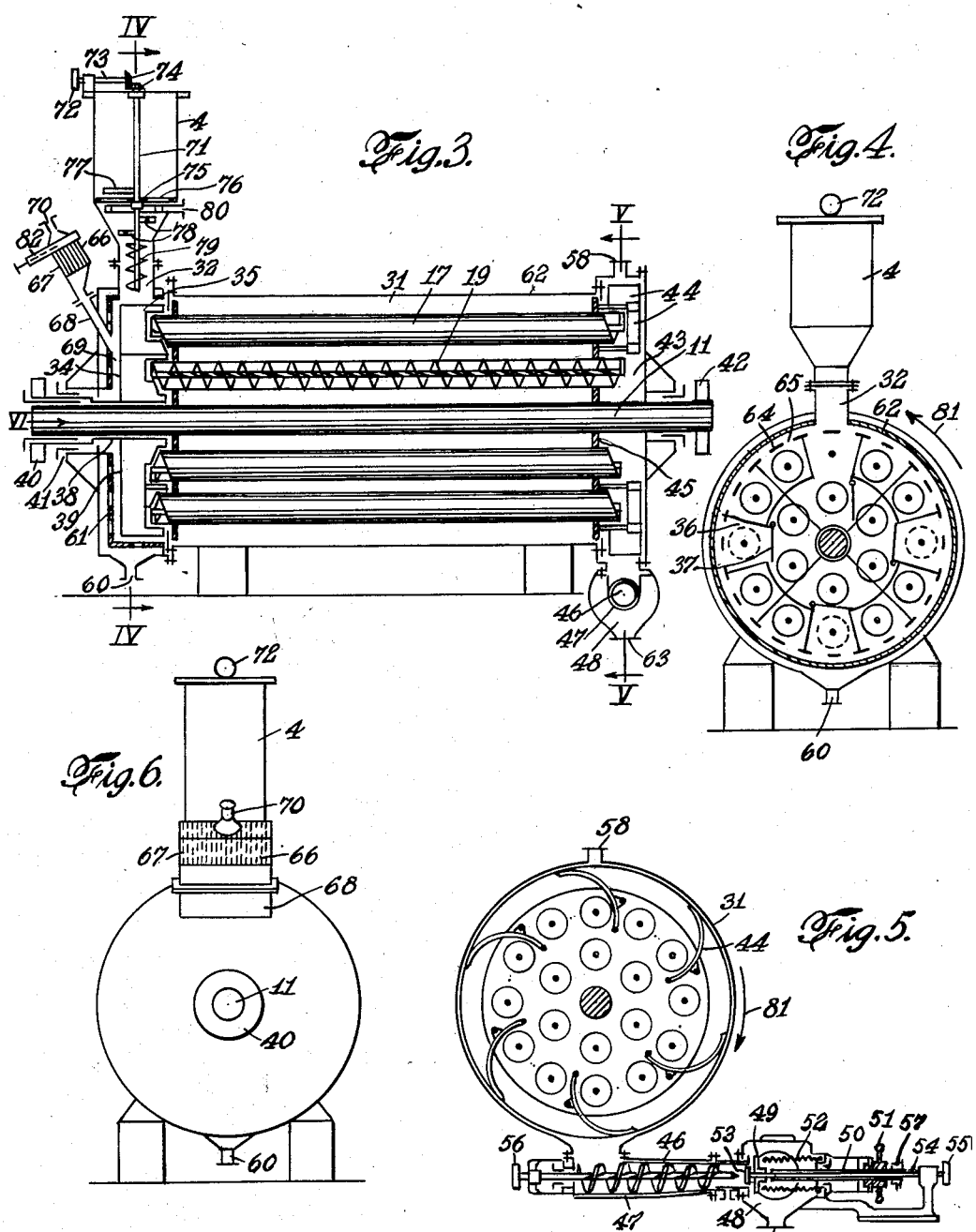

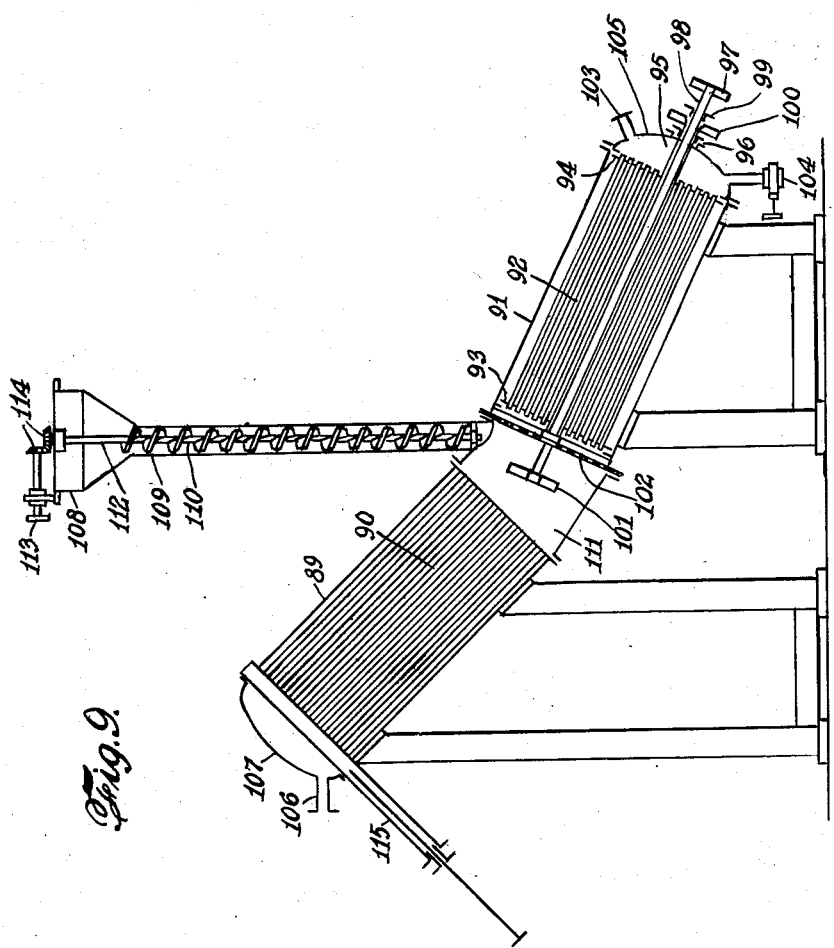

Patented May 12, 1953

2,638,409

UNITED STATES PATENT OFFICE 2,638,409

COUNTERCURRENT EXTRACTION APPARATUS AND PROCESS

Giacomo Bottaro, Genoa, Italy

Application December 10, 1947, Serial No. 790,809
In Italy, October 28, 1947

17 Claims. (Cl. 23—310)

This invention relates to a process and apparatus for countercurrent solvent extraction.

Various proposals for countercurrent extraction of various materials have been made and apparatus of various types provided for carrying out the extraction step. While these proposals have been successful in varying degrees, they have not attained the desired degree of efficiency, particularly in the extraction of solid materials by a liquid.

It is the object of the present invention to provide an improved process for countercurrent solvent extraction which makes possible an extraction of increased efficiency and avoids the drawbacks of the prior processes.

It is another object of the invention to provide an improved apparatus having features of construction which promote effective uniform extraction regardless of the nature of the material treated.

My process comprises the step of contacting liquid or solid phases countercurrently with a liquid extracting or washing phase, with the simultaneous application of a spiral movement around a given axis, thus effecting by reason of the spiral movement, the advancement of one phase while the extracting phase, which is always liquid, progresses countercurrently. The process is characterized by the fact that the phase to be extracted is broken up or subdivided at the moment of its entrance into the treating zone and is caused to move along a plurality of parallel, or substantially parallel eccentrically-related paths. The material in each path is separately treated by a portion of the liquid phase, which is also broken up or subdivided in an equal number of paths at the moment of its entrance into the opposite end of the treating zone. The subdivided portion of both phases are reunited to again form a single body after they have traveled the entire length of the treating zone.

The apparatus for carrying out my process comprises at least one row of not less than two pipes or tubes of relatively small diameter which are arranged on parallel eccentrically-related axes and adapted to be rotated about a common axis, and means for the intrduction and for the removal from the apparatus of the two phases to be treated. Means are also provided for the breaking up or subdividing of the two phases at their entrance into the tubes as well as means at the exit end of the device for uniting the streams before removal from the apparatus.

In one embodiment the apparatus has a helical spiral in at least one of the parallel tubes.

The apparatus may also be provided with means for circulating a heat exchange fluid having a temperature differing from that of the phases being treated.

Other features and characteristics of my invention will be evident from the following description and from the drawings.

While for purposes of illustration and ready understanding of my invention, several embodiments of my invention are described below, it will be apparent that other embodiments may be adopted without departing from the invention. In the accompanying drawings, wherein are shown the several illustrative embodiments of the invention, Fig. 1 is a vertical sectional view, partly in elevation, of an extracting apparatus embodying features of the present invention;

Fig. 2 is an end elevation of the apparatus of Fig. 1, showing a portion broken away;

Fig. 2a is a fragmentary view of an end elevation similar to Fig. 2 showing tubes of hexagonal cross section;

Fig. 3 is a vertical sectional view, partly in elevation, of another embodiment of the apparatus of the invention;

Fig. 4 is a sectional view taken approximately along the line IV—IV of Fig. 3;

Fig. 5 is a sectional view taken approximately along the line V—V of Fig. 3;

Fig. 6 is an end elevation of the apparatus shown in Fig. 3 viewed in the direction indicated by the arrow VI in Fig. 3;

Fig. 7 is a vertical sectional view, partly in elevation, of another embodiment of the apparatus of the invention;

Fig. 7a is a view of a tube as shown in Fig. 7 containing radial baffles;

Fig. 7b is a similar view of a tube containing a closed cylinder;

Fig. 8 is a sectional view taken approximately along the line VIII—VIII of Fig. 7; and Fig. 9 is a vertical sectional view, partly in elevation, of a further embodiment of the apparatus of the invention.

With particular reference to Figs. 1 and 2, 1 represents a cylindrical shell formed, for example, from heavy sheet-iron to which at one end is connected a frustoconical wall formed from a thick wire-netting 3 which is separated from a frustoconical shell 2, conveniently made of sheet-iron, by an annular space. A hopper 4 for the feeding of the heavier phase into the apparatus has a rectangular cross section and communicates with the interior of the apparatus through corresponding openings in elements 2 and 3. A plain end 5 is secured to the cylinder 1 by means of bolts and a feeding tube 6 is provided for the introduction of the exterior liquid phase. The apparatus has an outlet 7 for the withdrawal of the heavier interior phase and an outlet 8 for the withdrawal of the exterior liquid phase carrying the solute, outlet 8 communicating with the annular space between shell 2 and netting 3. Two stuffing boxes 9 and 10 are connected, respectively, to the plain end 5 and to the frustoconical bottom 2, and seal shaft 11 which is carried by bearings 12 and 13. The cylinder 1 is carried by two fixed supports 14 and 15 formed either of masonry or of iron. Mounted on shaft 11 is an iron cylinder 16 and metal tubes 17 are arranged in the interior of cylinder 16. Tubes 17 have the same length and are in this instance parallel to the axis of the cylinder. The tubes 17 are displaced (in Fig. 1) in a step-wise manner towards the middle of the apparatus as they progress from the wall of the enclosing shell toward shaft 11. Consequently the ends of the tubes are arranged in a step-wise manner as they progress from the center towards the periphery, so that at one end they form a frustoconical structure whereas at the other end they form a frustoconical recess. Tubes 17 may be circular as shown or polygonal in shape, e. g. hexagonal, as shown at 18 in Fig. 2a. They can be completely empty inside or contain a spiral as shown in 19, which can also be arranged about a central axis. Also baffle means can be provided instead of a spiral, as shown at 20, wherein the baffle means extend at a predetermined distance alternately and reciprocally from the interior wall of the tube to its axis so as to form a regularly broken line. Furthermore, I may provide other forms of baffles formed, for instance, of perforated sheets (similar to 116, Fig. 7) arranged perpendicularly to the direction of the current between two windings of the spiral and are particularly suitable when the apparatus is used for contact between two liquid phases. In this way the liquid interior phase flows through the holes of the perforated sheets in a plurality of streams in the middle of the exterior phase and the contact surface between the two phases is greatly increased. Other types of baffles, like those at 117, 118 in Figs. 7a and 7b, respectively, can also be provided.

Referring again to Fig. 1, a rod 21 rotates with cylinder 16 to which it is connected and scrapes the frustoconical netting 3. Shaft 11 is provided with a pulley 22 and a spiral 23 is connected to the exterior of cylinder 16. Spiral 23 has a height which corresponds to the thickness of the annular space between cylinder 16 and cylinder 1.

The operation of the extraction apparatus shown in Fig. 1 is as follows:

Through inlet 6 the exterior liquid phase, e. g. gasoline, is fed, filling the entire apparatus, passing through the tubes and the frustoconical surface of wire net 3 running through the space between it and the frustoconical wall 2, and flowing out through the opening 8.

From hopper 4 the interior heavier phase, e. g. meal from oilseeds, is fed into the extractor.

The row of tubes 17 arranged within cylinder 16 and connected with shaft 11 is set into rotating motion. The seedmeal falls and is distributed uniformly in the openings of tubes 17 which, because of the rotating movement, are continuously positioned under the slot cooperating with the hopper. If the meal is not caught by the tubes when falling, it will slide into the lower part of the frustoconical surface and will tend to fall towards the wall of cylinder 1 and during this movement will be caught by the passing mouths of the tubes during their rotation.

In this way each tube is fed with the same quantity of meal and in each revolution of a tube around shaft 11, the meal entering each tube will receive a rotational movement within the tube while remaining in the lower part of the interior wall of the tube, and in this way a forwarding movement of the meal is effected which is uniform in each tube going from left to right, as viewed in Fig. 1, countercurrently to the solvent. A successive quantity of meal will enter at the next revolution of the tubes and is forwarded in the same manner so that there is produced a continuous and combined revolving and sliding movement with a forwarding of the meal in the interior of the tubes. The solvent entering at 6 is regulated at will in proportion to the quantity of meal by known liquid pumping means (not shown).

When the meal has arrived at the opposite end of the tubes the extracted meal falls and goes out through opening 7 where it is collected by a screw conveyor which compresses it, squeezing out the solvent and forming a kind of compressed plug which hinders the flow of solvent from the apparatus.

The solvent during its movement within the tubes, meets the meal, which revolves in thin layers, and dissolves the oily substances contained in the meal, then proceeds towards the frustoconical end, is filtered through the net-wire surface 3 and leaves through opening 8.

Rod 21, which is connected with cylinder 16, scrapes the interior surface of the wire net so that a filter bed of a limited thickness remains on wire net 3.

Fines that may have accumulated in the space between cylinders 1 and 16 are continuously scraped and pushed towards mouth 7 by spiral 23.

With reference to Figs. 3 and 6, there are shown embodiments of the invention which do not have a frustoconical end. In view of the fact that the mouths of the tubes are all on the same vertical plane the difference in the peripheral velocity of the outer and the interior rows of tubes is fully felt, and some irregularity can take place in the uniform feeding of each tube, particularly in apparatus of large dimensions. A device is therefore provided which reduces the effect of this difference in the peripheral speed.

To this end, in the feeding chamber at the entrance of the apparatus there is arranged a device which is formed by a rotating cylindrical disc subdivided into circular sections by means of coaxial dividing rings. Each section corresponds to the tubes having the same distance from the axis. These dividing rings are provided with openings which allow the passage to each circular section of the precise quantity of meal which corresponds in exact proportion to the number of the mouths of the tubes of each circular section and no more.

If this disc is caused to rotate in the same direction as the rows of tubes, and if at the same time the cylindrical part of the disc is provided with slots connected with devices adapted to scrape the solid interior phase as it enters the apparatus and to let it fall in the interior of the rotating disc through the channel openings arranged in each circular ring in proportion to the number of the openings provided for each section, the solid phase will arrive in each section in a preordained quantity so that it may feed uniformly each tube. If the speed of the disc is so regulated as to be equal or less than the speed of the rows of tubes, the difference in the peripheral speed for each row of tubes may be reduced at will, thus diminishing the effect of the differences.

If on the contrary, the nature of the solid phase allows the differences in the peripheral speed between the external and the internal rows of tubes to be disregarded, then a good uniform distribution can be obtained for each tube by arranging guide members in the form of rings at the entrance of and around each row of tubes equally distant from the axis. These rings form a channel having both mouths directed upwardly in which the mouths of each row of tubes rotate. They thus take the quantity of the solid phase which accumulates therein after having fallen by gravity and cause it to enter each channel proportionally to the number of the mouths of each row of tubes. The guide members do not move and are arranged in place of the rotating disc in the feed chamber of the apparatus.

Another feature of the invention pertains to the means for extracting the treated solid phase from the lower part of the apparatus without allowing the solvent to flow out. For this purpose, a screw conveyor is arranged at a suitable point and the material caught by it is compressed into a chamber placed immediately adjacent the outlet, which in turn is provided with a closing means which stops the flow of the solvent when there is no meal in the screw conveyor. This is effected by means of a metal cover pressed by springs which, when the meal is moved by the screw conveyor, keeping a constant pressure on the discharging material, hold it and insure its continuous compression. A rotating metallic surface provided with scraping means is arranged on the inside of the cover and, under the action of the closing force due to the action of the springs, continuously scrapes the discharging plug formed by the compressed material, which thus falls out in the form of small pieces.

Furthermore, in order to insure continuous and effective feeding of the screw conveyor, a device formed by bent blades is connected to the tube plate which carries the rows of tubes, so that their rotation compresses the layer of extracted material which accumulates at the entrance of the screw conveyor and insures its being caught by the conveyor windings.

A third feature of the present invention analogous to that obtained with the device indicated in Fig. 1 is to insure the flowing out of the apparatus of a clear solute. To this end a filter is arranged in such a way that the material to be extracted will form a filter bed having a uniform thickness, the thickness being kept constant by means of a continuous scraping action by the rotation of the feeding disc.

A fourth feature of the invention is that of allowing the "fines" of the solid interior phase to flow out of the apparatus by passing through sliding surfaces having very much reduced passages between them, e. g. pipes of a few millimeters diameter and in which the flow of the solute is slow enough to permit the falling out and the backsliding of larger particles that may have been initially entrained with the outflowing current of the solute, whereas the "fines" are still held in suspension and flow out. This separation of the finer and coarser particles can be modified at will by changing the velocity of the flow, while keeping the quantity of flow constant within the narrow passage between the sliding surfaces. If the velocity of the flow is conveniently reduced it is possible to obtain a clear solution without the aid of the filter.

In Figs. 3 to 6 is shown an apparatus adapted for effecting these results. The reference numeral 31 designates a rotating complex of tubes 17 mounted in a shell 62 and provided with a spiral as shown at 19 in Fig. 1. In the apparatus of Figs. 3 to 6, 32 is the feed chamber under hopper 4 for solid phases and 34 is the rotating disc; 35 designates the circular dividing rings which limit the feed sections; 36 indicates the channel openings through rings 35, which allow the passage of the oily meal proportionally into the mouths of the tubes 17. Movable closures 37, which open and close by gravity during the rotation of the disc, prevent the solid phase from falling into the feed section of another row of tubes below when the openings are directed downwards, but open when they are directed upwardly at the moment when the solid phase enters into the openings and falls into the section intended for it. The disc 34 is provided with scrapers 64 and guides 65. Connected to the rotating disc 34, which has a perforated wall 39, is a hollow shaft 38 driven by pulley 40 through stuffing box 41 and a filter surface 61 is disposed around disc 34. The tubes 17 positioned about rotating shaft 11 discharge into chamber 43 which is provided at one side with bent blades 44 integral with the tube plate. A screw conveyor 46 is arranged in a casing 47, a space 82 being provided at the discharge end of screw 46 in which is positioned a cover 49 driven by shaft 50, rod 51 and spring 52. A cutting surface 53 is carried by a shaft 54 driven by a pulley 55, a stuffing box 57 closing the outlet around shaft 54. Screw conveyor 46 is driven by a pulley 56 and the solvent enters through inlet 58. 60 is the outlet for the solution. Material conveyed by screw 46 is discharged through outlet 63.

As shown in Fig. 6 and at the left in Fig. 3, connected to the apparatus is a rectangular main 68 communicating with a rectangular container 67 in which is positioned a row of pipes 66 of very small diameter and which provides a solution outlet 70, a gate 82 serving to control the flow of solution. A passage 69 connects feed chamber 32 with container 67. Interiorly of hopper 4 is a rotatable shaft 71 driven by pulley 72 through shaft 73 and spur wheels 74. In the hopper 4 is a diaphragm 75 having adjustable holes 76. Above diaphragm 75 is a rotating arm 77 connected with shaft 71 and arranged above diaphragm 75. Also secured to shaft 71 but below diaphragm 75 are rotating arms 78. A screw 79 is positioned in feed chamber 32 below a perforated tube 80 which lies below diaphragm 75 and has its perforations on its lower side.

The operation of the device is as follows:

The solvent enters through inlet 58 and fills all the space comprised between chambers 32 and all of the spiral tubes 17, flowing out through filter 61 or through the row of small diameter tubes 66. After the apparatus is thus filled with solvent, tubes 17 are put into motion and rotate in the direction of arrow 81 by means of shaft 11 driven by pulley 12.

At the same time, the rotating disc 34 driven by the hollow shaft 38 and pulley 40 is caused to rotate in the same direction with a velocity lower than that of the tubes 17, by means of pulley 40 and the hollow shaft 38 through hopper 4. The solid phase to be extracted is fed through hopper 4, the quantity being controlled by adjustable slot 76. Feeding is effected by means of the rotation of arm 77 and the solid phase passes into chamber 32 where, by means of scrapers 64 and openings 65, it passes through the rotating disc 34 and is conveyed through the channels 36 and the circular sections defined by the dividing rings 35, and with the assistance of the movable openings 37, to the mouths of tubes 17 and thence forwarded to discharge chamber 43 counter-currently to the solvent. Since the extracted material always has a specific gravity greater than that of the solvent, it falls to the bottom of chamber 43 and by means of the bent blades 44 is pressed on the windings of screw conveyor 46. At the same time, the solvent proceeds from chamber 43 through the spiral tubes and rotating disc 34 into chamber 32 and, after passing filter 61 where scrapers 64 as well as the members that connect the hollow shaft 38 with the rotating disc will limit the thickness of the layer of material which acts as a filter bed, flows out through opening 60.

Screw conveyor 46, under the action of bent blades 44, catches the extracted material and by means of power applied to pulley 56, presses the meal through the windings towards cover 49 which, by means of hand driven shaft 51, has been relieved of the pressure of shaft 50, thus remaining only under the action of spring 52. This spring will give way under the greater thrust of the extracted material which is pushed forward by the screw 46, and the plug formed by the compressed material in chamber 48 will thus come into the open after having been scraped and broken up by the rotating device 53, which will have been set into motion by means of pulley 55 and shaft 54. The solvent pressed out of the extracted material follows the windings of screw 46 back into the apparatus. It may be sometimes convenient in order to avoid choking of the filter to permit for a certain time, for instance after the apparatus has operated for a few days, the solution to pass through slot 68 and the row of small diameter tubes 66. In this way colloidal "fines" that may have accumulated in chamber 32 are entrained by the flow of solution, taken out of the apparatus and handled separately, while coarser particles slide back into chamber 32 and are forwarded through tubes 17. If there are no colloidal "fines," then the action of filter 61 can be excluded. To this effect, the closing member 82 is adjusted to increase the diameter of the flow path through the row of tubes 66 and the velocity of the flow being thus reduced without increasing the rate of flow, practically all turbid portions slide back into chamber 32. Conversely, and if it is desired that fine particles leave the apparatus with the solution, closing means 82 is adjusted to reduce the size of the flow path, and the velocity of the flow thereby being increased, coarser particles which otherwise would slide back are entrained.

Hopper 4 fulfills two functions, the first of which consists in the introduction of the interior solid phase into chamber 32 by way of shaft 71, adjustable slots 76 of diaphragm 75 and the help of arms 77 and 78, and screw 79. Its second function is another feature of the invention. Through pipe 80 all solvent which contains air from the vents of the apparatus is discharged under diaphragm 75 so that the oil-containing meal which descends through the hopper acts as a solvent vapor absorber and the air is freed from solvent vapors.

This automatic system replaces with advantage and with greater efficiency the method used generally for absorbing solvent vapors by means of active carbon.

A somewhat different construction is followed when it is desired to submit the apparatus to a heating or cooling process, or both, during the extraction, or when, in the case of apparatus of large size it may become difficult to support the entire weight on bearings. In this case the row of tubes does not simply rest on the two tube plates, but is welded to the two tube plates so as to have a perfectly sealed unit which is then submerged in a tank containing a liquid which can be either cooled or heated, or both in succession. For this purpose dividing walls are arranged along the length of the row of tubes to divide the bath into sections which can be heated or cooled at will, if the extraction process should call for such a treatment.

Naturally the liquid in the bath causes a hydrostatic pressure to act on the tubes so that their apparent weight is more or less reduced. Said weight can also be completely nullified as a result of the increased specific gravity of the liquid or if airtanks are arranged at the extremities of the submerged portion of the apparatus. In this way the bearings act simply as guides, and the apparatus can be constructed and made to operate with dimensions that would be otherwise mechanically impossible to employ. This method can be used also when, the interior phase being very heavy, the use of a single spiral is desired.

Figs. 7 and 8 show schematically a practical embodiment of an apparatus for obtaining these results. The row of tubes 17 is connected to the tube plates 83 which are positioned in a tank 84 containing the heat-exchange liquid and are connected to the hydrostatic air tanks 85. Inlet and outlet means for the phases being treated are shown at 86 and 87, respectively, and the tank 84 is divided by a partition wall 88. Semicircular channels with their mouths directed upwardly are defined by baffles 119 fixedly secured between the bottom 120 and tube plates 83.

The operation of the apparatus is as follows:

Tank 84 is filled with a liquid having a specific gravity to offset the weight of the tubes when they are filled with the phases being treated and the tubes are totalling submerged. This liquid may, if desired, have a different temperature on the left and on the right of the partition wall 88. Feeding takes place through a hopper 80 and a screw conveyor which feeds the interior phase at the center of the apparatus through wall 120. The interior phase is conveyed on baffles 119 from which it passes to the tubes 17 and then travels countercurrently to the liquid phase as described. Means for heating or cooling are not shown.

In Fig. 7a is shown a tube having its volume reduced by a hermetically closed pipe 117. In Fig. 7b longitudinal baffles 118 are shown, which rest on the interior side of a wall of one of tubes 17.

In Fig. 9 another embodiment of the invention is shown. In a fixed cylinder 89 positioned at a substantial angle are disposed in parallel relationship rows of pipes 90 of small diameter. A fixed cylindrical shell 91 contains a row of parallel eccentrically-related pipes 92 of small diameter which are arranged fixedly in and carried between the two tube plates 93 and 94 which rest on shaft 95. A stuffing box 96 closes the shaft 95 and a pulley 97 drives shaft 95. A shaft 98 closed by stuffing box 99 driven by pulley 100 carries a stirrer 101. A wire screen is shown at 102. Means for the inlet and outlet of the liquid and semi-liquid phases 103 and 104 are arranged on bottom 105 of shell 91 while an outlet 106 for the liquid phase is positioned at the bottom 107 of cylinder 89. A hopper 108 serves for the feeding of the solid phase and a pipe 109 containing the screw conveyor 110 unites hopper 108 with chamber 111, which connects cylinders 89 and 91. Screw conveyor 110 is driven by shaft 112 which is caused to rotate with screw conveyor 110 by pulley 113 driven by the frusto-conical spur wheels 114.

Operation of the above-described apparatus is as follows:

Extracting liquid, for instance water, enters through inlet 103 and flows out at 106 while outlet 104 is closed. Successively pulleys 97 and 100 are placed in motion, thus effecting a rotating movement of the tubes 92 and of stirrer 101. Immediately thereafter, the solid phase, which is very finely divided, is caused to enter the apparatus along the path 108—109—110 into chamber 111 where the solid phase stirred by agitator 101 is dispersed in the liquid phase. The finely divided solid phase passes through screen 102 in the rotating pipes 92, meets the ascending wash liquid and transfers to it the soluble material which it contains. The rotating row of pipes 92 rotates very slowly so that the solid phase is permitted to settle and to rest on the lower part of the tubes. In this manner and because of the inclination, a current of solid phase moves downwardly with a spiral motion by reason of the rotating movement. In this way the length of the treating course is increased in the row of pipes 92 and consequently the efficiency of the extracting process is increased.

The solid phase reaches the bottom 105 and flows out through outlet 104 which is conveniently opened so that only the solid phase soaked with the wash liquid may leave and not the wash liquid itself. The wash liquid, after having traveled through the row of pipes 92, enters through screen 102 into the stirring chamber 111 and from there flows to the row of pipes 90 entraining some of the "fines" of the solid phase, which for the most part settle on the lower portion of pipes 90 and slide back to chamber 101 and from there through screen 102, pipes 92 and outlet 104 and leave the apparatus. In its turn the wash liquid containing the solute leaves in a more or less bright condition from outlet 106.

Although for reasons of simplicity of description the present invention has been described on the basis of certain illustrative embodiments shown in the accompanying drawings, various variations in the embodiments illustrated may be made within the scope of the invention. For example, the entrance at the ends of the tubes 17 at the side of member 3 of Fig. 1 may be modified in several ways. The first winding may, for example, be given a larger thread or may be made in the form of a spoon by which a better filling of the spiral may be obtained or the tubes 17 may be arranged transversely with respect to the axis of rotation. Similarly, the main axis of the apparatus may be inclined downwardly in the direction of flow of one of the phases, preferably the heavier one. The row of tubes may be positioned to permit more phases to be handled. The construction of the rotating disc may be simplified as by providing blades that lift the heavier phase to the mouths of the tubes. The tubes of small diameter at the solvent exit may be replaced by flat surfaces very close to each other. The tubes may be provided with spiral sections of a limited length and arranged at a predetermined reciprocal distance from each other. These and other variations are included within the scope of the appended claims and it is intended that all matter contained in the foregoing description and in the drawings shall be interpreted as illustrative and not in a limiting sense.

What I claim is:

1. In a continuous counter-current washing and extracting process for treating liquids and solids by means of a liquid treating agent which comprises, continuously introducing the material to be treated under positive pressure into one end of a treating zone, distributing the material into a plurality of separate substantially parallel eccentrically-related continuous streams, imparting a spiral movement to the material in each of said streams, continuously introducing under positive pressure into the other end of the treating zone a liquid treating agent of a lower specific gravity than the material being treated, distributing said treating liquid into a plurality of separate parallel eccentrically-related continuous streams, each of said treating liquid streams being caused to flow in a continuous path countercurrently along the same continuous path being traversed by one of said streams of material being treated, whereby intimate continuous countercurrent contact between the material being treated and the treating liquid is effected along each of said separate paths, reuniting the streams of treated material at one end of the treating zone, removing said treated material from the zone, reuniting the streams of the treating liquid at the other end of said zone and removing the said liquid therefrom.

2. In a continuous counter-current washing and extracting process for treating liquids and solids by means of a liquid treating agent which comprises, continuously introducing the material to be treated under positive pressure into one end of a treating zone, distributing the material into a plurality of separate substantially parallel eccentrically-related continuous streams, imparting a spiral movement to the material in each of said streams, continuously introducing under positive pressure into the other end of the treating zone a liquid treating agent of a lower specific gravity than the material being treated, distributing said treating liquid into a plurality of separate parallel eccentrically-related continuous streams, each of said treating liquid streams being caused to flow in a continuous path countercurrently along the same continuous path being traversed by one of said streams of material being treated, whereby intimate continuous countercurrent contact between the material being treated and the treating liquid is effected along each of said separate paths, heating the separate streams of treating liquid and material treated, reuniting the streams of treated material at one end of the treating zone, removing said treated material from the zone, reuniting the streams of the treating liquid at the other end of said zone and removing the said liquid therefrom.

3. Counter-current extracting and washing apparatus for treating liquids and solids with a liquid of lower specific gravity which comprises, in combination, a plurality of parallel eccentrically-related tubes arranged for rotation about a common axis on axes parallel to said common axis, non-rotatable chambers at each end of said tubes into which the respective ends of the tubes discharge, an elongated inlet conduit communicating with one of said end chambers for positive pressure feed of the material to be treated, an inlet for the treating liquid in the other of said end chambers, means for forcing said treating liquid through said inlet under positive pressure, an outlet in the lower part of said first named chamber and an outlet in the lower part of said second-named chamber.

4. Apparatus as defined in claim 3 wherein at least one of said tubes is provided with baffles extending inwardly in alternately staggered relationship from the walls of the tube.

5. Apparatus as defined in claim 3 wherein at least one of said tubes is provided with a longitudinal baffle extending inwardly from the wall of the tube and parallel to the axis of the tube.

6. Apparatus as defined in claim 3 wherein there is positioned interiorly of at least one of said tubes a loosely fitting closed tube of lesser diameter than the diameter of the first-named tube and adapted to float in the treating liquid and to limit the internal volume of said first-named tube.

7. Apparatus as defined in claim 3 wherein said first named chamber has a frustoconical shape and the ends of the tubes received in said chamber are arranged in step-wise manner whereby to occupy a substantial portion of said chamber.

8. Apparatus as defined in claim 3 wherein a perforated transverse baffle is provided in at least one of the tubes.

9. Apparatus as defined in claim 3 wherein at least one of said tubes is provided with a single thread spiral.

10. Apparatus as defined in claim 3 wherein at least one of said tubes is provided with a multiple thread spiral.

11. Apparatus as defined in claim 3 wherein said two chambers are joined by a cylindrical member spaced from the outer surfaces of the tubes and a spiral is provided in the space between the member and the tubes.

12. Apparatus as defined in claim 3 wherein means are provided for subjecting the tubes to a hydrostatic thrust.

13. Apparatus as defined in claim 3 further comprising a rotating disc in said first named chamber, said disc being provided with a guide member comprising a series of concentric ring sections positioned to open into each layer of tubes, each ring section being provided with movable closing members, and the surface of said disc being provided with slots and scrapers.

14. Apparatus as defined in claim 3 wherein at least one of said tubes is provided with a helicoidal member secured in and non-rotatable with respect to said tube.

15. Apparatus as defined in claim 14 wherein the helicoidal element has at one end a thread of greater pitch than the remainder of the element.

16. Apparatus as defined in claim 14 wherein said helicoidal member is formed from a plurality of separated sections.

17. Apparatus as defined in claim 16 wherein the sections of the helicoidal member are bridged by baffles.

GIACOMO BOTTARO.

References Cited in the file of this patent

UNITED STATES PATENTS

| Number | Name | Date |
|---|---|---|
| 591,909 | Argall | Oct. 19, 1897 |
| 709,704 | Grill | Sept. 23, 1902 |
| 1,406,525 | Bonillon | Feb. 14, 1922 |
| 1,659,794 | Weihe | Feb. 21, 1928 |
| 2,012,298 | Berge | Aug. 27, 1935 |
| 2,063,446 | Lanzi et al. | Dec. 8, 1936 |
| 2,199,928 | Van Wirt | May 7, 1940 |
| 2,218,080 | Bottaro | Oct. 15, 1940 |

FOREIGN PATENTS

| Number | Country | Date |
|---|---|---|
| 500,072 | France | Mar. 2, 1920 |
| 718,705 | France | Jan. 28, 1932 |